March 15, 1966     C. L. DU VIVIER     3,241,104

TRAFFIC CONTROL

Filed Sept. 1, 1961     7 Sheets-Sheet 1

*INVENTOR.*
CHARLES L. DuVIVIER

BY

*Harold A. Dixon*

ATTORNEY

INVENTOR.
CHARLES L. DuVIVIER
BY
Harold A. Dixon
ATTORNEY

INVENTOR.
CHARLES L. DuVIVIER
BY
Harold A. Dixon
ATTORNEY

March 15, 1966  C. L. DU VIVIER  3,241,104
TRAFFIC CONTROL
Filed Sept. 1, 1961  7 Sheets-Sheet 5

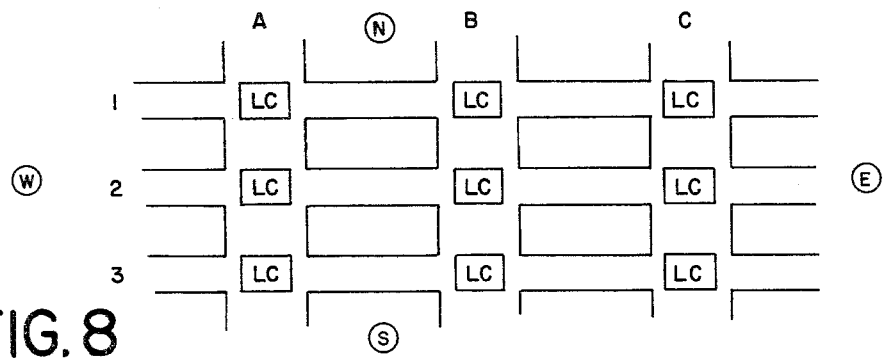

9A AVENUES
| STREETS | A | B | C |
|---|---|---|---|
| 1 | 0 | 0 | 0 |
| 2 | 10 | 10 | 10 |
| 3 | 20 | 20 | 20 |

SOUTHBOUND PREFERENCE
WITH E-W SIMULTANEOUS

9B
| 0 | 10 | 20 |
|---|---|---|
| 10 | 20 | 30 |
| 20 | 30 | 40 |

SOUTHBOUND AND
EASTBOUND PREFERENCE

9C
| 20 | 10 | 0 |
|---|---|---|
| 30 | 20 | 10 |
| 40 | 30 | 20 |

SOUTHBOUND AND
WESTBOUND PREFERENCE

9D
| 20 | 20 | 20 |
|---|---|---|
| 10 | 10 | 10 |
| 0 | 0 | 0 |

NORTHBOUND WITH
E-W SIMULTANEOUS

9E
| 20 | 30 | 40 |
|---|---|---|
| 10 | 20 | 30 |
| 0 | 10 | 20 |

NORTHBOUND AND
EASTBOUND PREFERENCE

9F
| 40 | 30 | 20 |
|---|---|---|
| 30 | 20 | 10 |
| 20 | 10 | 0 |

NORTHBOUND AND
WESTBOUND PREFERENCE

9G
| 0 | 50 | 0 | 50 |
|---|---|---|---|
| 10 | 60 | 10 | 60 |
| 20 | 70 | 20 | 70 |
| 30 | 80 | 30 | 80 |

SOUTHBOUND PREFERENCE
WITH AVERAGE
EAST-WEST PREFERENCE

9H
| 30 | 80 | 30 | 80 |
|---|---|---|---|
| 20 | 70 | 20 | 70 |
| 10 | 60 | 10 | 60 |
| 0 | 50 | 0 | 50 |

NORTHBOUND PREFERENCE
WITH AVERAGE
EAST-WEST PREFERENCE

9K
| 0 | 50 | 0 | 50 |
|---|---|---|---|
| 50 | 0 | 50 | 0 |
| 0 | 50 | 0 | 50 |
| 50 | 0 | 50 | 0 |

AVERAGE N-S
AND AVERAGE E-W
PREFERENCE

NUMBERS INDICATE OFFSET IN PERCENT OF CYCLE.

INVENTOR.
CHARLES L. DUVIVIER
BY Harold A. Dixon
ATTORNEY

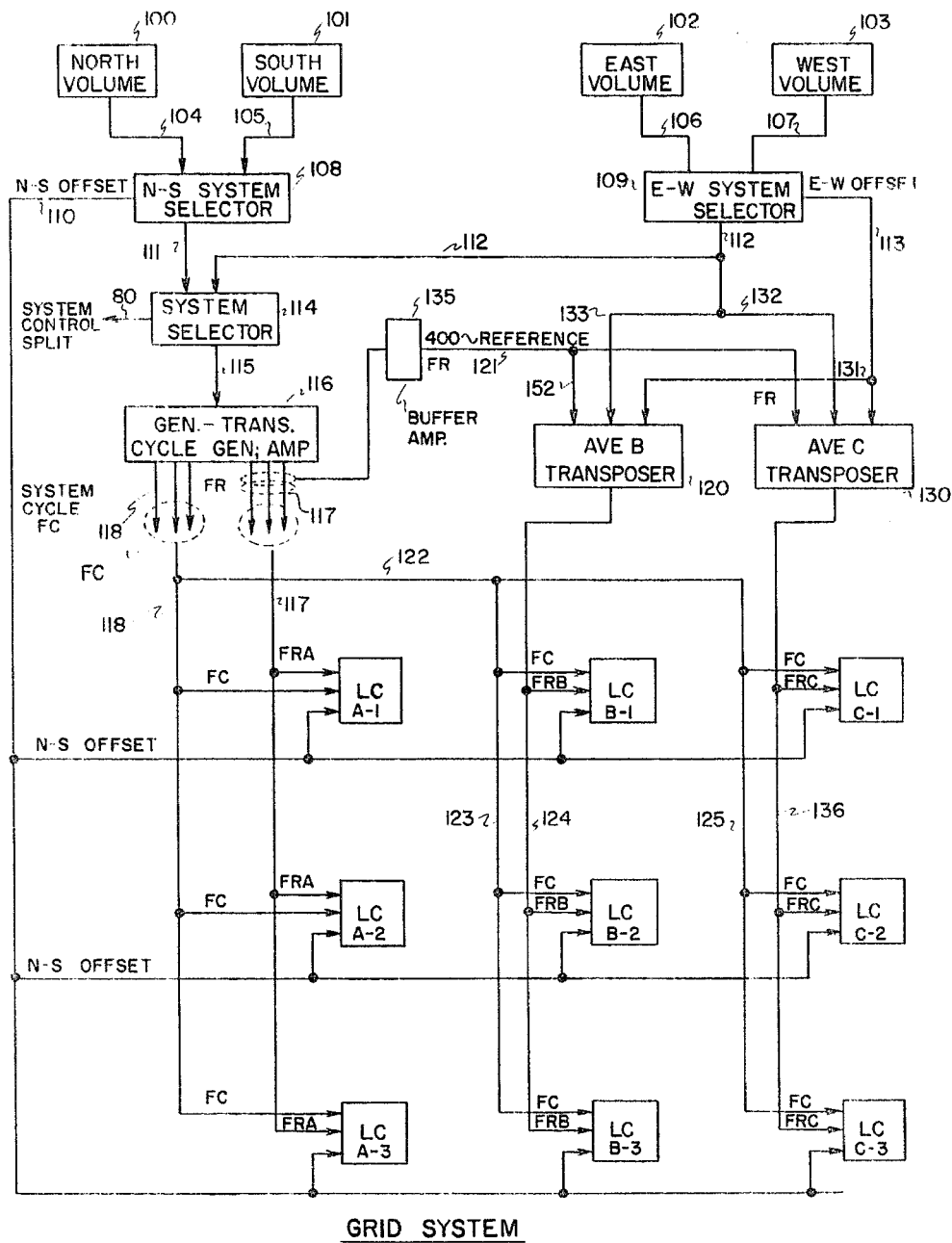

INVENTOR.
CHARLES L. DuVIVIER
BY
Harold A. Dixon
ATTORNEY

United States Patent Office 3,241,104
Patented Mar. 15, 1966

3,241,104
TRAFFIC CONTROL
Charles L. Du Vivier, Darien, Conn., assignor to Laboratory for Electronics, Inc., Boston, Mass., a corporation of Delaware
Filed Sept. 1, 1961, Ser. No. 135,533
20 Claims. (Cl. 340—35)

This invention relates to apparatus and methods for controlling traffic. More particularly this invention relates to novel traffic control apparatus and methods in which one traffic controller or a plurality of controllers along a street or in a traffic grid system are controlled by a master time cycle in which the time at which traffic signal switching occurs at these controllers with respect to a reference in the master time cycle is varied or selected automatically in response to and in dependence upon one traffic responsive circuit and in which this time as so varied or selected is further varied or selected in response to and in dependence upon another traffic measurement.

The invention is highly significant in traffic control systems in which local controllers sequentially accord right-of-way in two intersecting directions when initiated in a local time cycle synchronized with a master time cycle. In such a system, this invention provides two traffic measurements which each individually advance or retard in time the initiation or offset of the local time cycle with respect to a reference point in the master time cycle so that the offset selected is the result of both traffic measurements. While this concept has many applications, one particular application is to a traffic grid in which measurements of traffic in one traffic direction vary the offset of the local controllers to provide a progression of right-of-way in that traffic direction and in which a measurement of traffic in another traffic direction further varies the offset of a group of traffic controllers along one street with respect to a further variation of offset of a group of traffic controllers along streets parallel the one street thereby providing a progression of right-of-way in said another traffic direction while maintaining the progression in said one traffic direction. Such complicated bi-directional offset changes are provided smoothly in the shortest possible direction from one selected offset to another in response to changes in the traffic measurement.

In traffic control systems, local traffic controllers are positioned at an intersection and include apparatus for switching traffic signals at various response points to provide a local time cycle of traffic signal indications at that intersection which sequentially accords right-of-way in an initial traffic direction along an artery for example and then subsequently in another traffic direction along the cross street for example before returning the right-of-way to the initial traffic direction to complete a cycle of traffic signals. Since a cycle may be considered 100%, this switching of right-of-way is controlled to occur at predetermined fractional or percentage points within the local time cycle, one of which may be zero. One such point in the local time cycle is referred to as the "split" point and determines the respective portions of the local time cycle which are apportioned to accord right-of-way in the respective intersecting directions. When such a system utilizes a control master having a master time cycle, these fractional points also refer to points within the master time cycle.

The time required for the local controllers to complete a cycle of switching or the time required to complete a master or local time cycle is referred to as the traffic "cycle length" and is of the order of 40–120 seconds.

The invention is particularly applicable to systems using a master cyclic electrical timing signal which is varying from one electrical value to another within a cyclic time period in which various values represent predetermined fractions of the master time cycle for thereby continually synchronizing the local time cycle for the local controllers and for controlling the rate of traffic signal switching at a local controller without the necessity of the usual resync signal. The electrical values may be of varying phase or frequency or voltage or current or various forms of pulses. These varying values of master time signals are sensed either at the local controllers or by circuitry which controls the local controllers so that the local time cycle is offset from the master time cycle to thereby switch from one traffic signal indication to another at one or more particular points within the master time cycle represented by one or more of said electrical values. In such a system, in accordance with one aspect of the invention, both traffic measurements cooperate to jointly vary or select the local time cycle thereby varying the point or points within the master time period at which the traffic signals are switched. The cooperation is such that each traffic measurement varies the offset and/or split and/or cycle length in proportion to the amount of each traffic measurement and each such variation may be in the same or opposite directions in an additive or subtractive or other selective manner within and as a fractional percentage of the local or master time cycle. In addition, this system is applicable to other types of master control including systems in which the master signal does not vary in value but rather sequentially provides signals of different values so that recognition of these different values indicates some percentage of the master time cycle.

The traffic responsive circuits may each include apparaus for measuring any desired traffic characteristic at any of numerous locations; one preferred form includes the measurements of traffic volume in two intersecting directions to select one of a plurality of outputs in response to varying degrees or amounts of traffic measurement. Other forms of traffic responsive circuits may provide electrical output signals which vary directly in voltage, current or some other parameter in proportion to the change in traffic speed, volume or density measured for example.

In the preferred embodiment, the cyclic electrical master time signal includes two alternating current waves which differ slightly in frequency to provide a sequence of phase coincidence signals which successively step a local controller through its cycle of traffic signal indications. In such a system the master signal is continually varying in phase so that phase coincidence occurs repetitively within a master time period or cycle. The local controllers receive both of said waves, respond at coincidence of phase between the two waves and thus are continually synchronized with the master time cycle. In such apparatus, the time at which phase coincidence occurs at the local controller with respect to the master control cycle, determines the offset of the local time cycle of the local controller from the master time cycle. Accordingly the preferred form of the invention provides apparatus by which the two traffic responsive circuits cooperate to jointly vary the phase of one or both of the A.C. signals in the same or opposite direction to thereby vary the offset of the local time cycle of the local controller with respect to the master time cycle. However, the invention is not limited to such a cyclic master timing signal but may include cyclic signals which vary cyclically in voltage, current, frequency, pulse repetition rate or any other well known type of cyclic signal which may be used to provide a cycle of traffic signals as stated above.

In this invention, one of the traffic measurements makes a first selection or variation in offset for example while the second traffic measurement provides a further selection in offset so that the resulting offset may be a result of the arithmetic sum or difference or other direct function of both measurements.

While the invention has its most significant application to a traffic control grid system, it has solved numerous other traffic control problems efficiently and automatically in a manner not anticipated by the prior electrical mechanical traffic control systems. For example, in a system of local traffic controllers along a street in which a master controller provides a first traffic measurement to provide a progression in time of the right-of-way signals along the artery, this progression may be modified at one or more controllers in response to a measurement of traffic speed, traffic volume or traffic density etc. on the cross street or artery at that intersection for example to aid or retard the high speed traffic or to aid the cross street traffic by modifying the offset, split or cycle length at that intersection. Another problem which has been solved with this invention is the problem of stopped groups of vehicles in a progressive traffic control system. Such progressive traffic control systems permit groups of vehicles to receive right-of-way signals at the proper time at successive intersections permitting them to proceed through succeeding intersections at a preset speed without stopping. However, if for some reason some of these vehicles are stopped, it would be difficult for these vehicles to get back into step with the traffic signals. However, by sensing the speed of these vehicles to indicate stoppage, the offset of the controllers may be increased upon sensing stoppage to permit these vehicles to accelerate to the preset roadway speed after which the normal progressive sequence of offset may be provided. Another application of the invention could apply to progressive traffic control systems to compensate for heavy traffic flow. In such a system the cycle length is increased to accommodate the heavy traffic. Such an increase in cycle length would automatically increase the offset time between adjacent intersections since the offset is generally a fraction of the cycle length. Such an offset change will reduce the speed of those vehicles and accordingly this invention may be used to change the offset to increase the speed.

Another application of the invention is in a master-local traffic control system in which the master controller first determines the offset of the right-of-way signals along the artery of the system, and one or more cross streets may have a substantial left or right hand turn traffic onto the artery. In such a system a measurement of this cross street traffic may be used to modify the offset of the controller at its intersection to permit these cross street vehicles to form a part of the artery progression or it may modify the offset at the next intersection to provide a "leading green" to clear vehicles on the artery at the next intersection before the turning cross street traffic reaches that intersection. Numerous other applications of this invention will be obvious from the detailed disclosure of this invention.

Furthermore, the invention provides an improved method of controlling master controllers and local controllers which are responsive to a plurality of traffic measurements.

While the invention has solved the above mentioned and other traffic control problems, it has done so inexpensively in a novel manner not anticipated by the prior art.

Traffic grid patterns could of course be calculated to treat various of these individual conditions, but this would require the continual employment of traffic or service personnel adjusting each of the local controllers to the new pattern. During such adjustment substantial confusion is likely to exist since some of the controllers are adjusted for one traffic pattern while the others are adjusted for another traffic pattern. Accordingly the invention provides that at least one and preferably both of these individual changes be done slowly over several traffic signal cycles. Furthermore in such a grid system the change in offset required is generally not a linear function of the sum of the plurality of traffic measurements but in many cases may be the difference or some other functions; accordingly the apparatus must provide this function.

Accordingly it is an object of this invention to provide a traffic controller which is controlled by a cyclic electrical signal and in which its offset (or split point) within the cyclic electrical signal varies in the same or opposite directions directly and preferably as equal or unequal percentage of the time period of the cyclic signal in response to and as a function of two or more individual traffic measurements so that the resulting offset or split is a function of both individual traffic measurements.

It is another object to provide a local traffic controller controlled by a master controller by means of a master cyclic electrical timing signal in which a local traffic signal switching cycle is maintained in synchronism with the master cyclic signal but may be offset in time from the master signal directly in dependence upon the cooperative action of the measurements of two or more substantially different traffic quantities or two measurements in different intersecting directions.

Another object is to provide traffic control apparatus which will vary the rate of a cyclic electrical control signal linearly first and second individual amounts in response to two individual traffic measurements so that the cyclic switching of traffic signals varies at a rate determined by the sum of two traffic measurements.

A further object is to provide apparatus in which the cycle length or offset or split of a traffic control system is slowly increased or decreased a first amount in the shortest possible direction from one selected value to another in response to a change in a first traffic measurement and in which the cycle length or offset or split is further increased or decreased automatically in response to a change in a second traffic measurement independent of the first traffic measurement.

A further object of the invention is a traffic control grid system of intersecting streets and avenues with traffic controllers at the intersections for providing right-of-way signals along the streets and avenues as determined by offset determining apparatus is to commonly control and vary the offset of groups of controllers to offset the right-of-way signals along the streets at their intersection with one avenue with respect to right-of-way signals along the streets at the intersection of other avenues in response to a first measure of traffic while further varying the offset of the local controllers in response to a second traffic measurement.

Another object is to provide a traffic control grid system in which a cyclic master control time cycle signal varies in electrical value from one value to another with a cyclic time period for controlling the local controllers and in which the offsets at the respective controllers is a fraction of the master time cycle represented by a predetermined value which is the algebraic sum of any one of three values determined by one traffic measurement and any one of another three values determined by a second traffic measurement.

Another object is to provide a traffic control grid system in which the offset of the local controllers at the intersections of the grid may have any desired offset to provide any desired traffic signal progressions along a plurality of avenues and intersecting streets by the use of two or more individual traffic measurements which may each individually vary the offset of the signals at each intersection in the same or opposite directions.

A still further object is to provide traffic control apparatus for controlling traffic controllers at the intersections of a grid in which the local controllers are controlled in synchronism with a varying electrical master timing signal in a local time cycle so that the local time cycles of groups of controllers along one street may be displaced in time with respect to the master time signal and with respect to the local time cycle of groups of controllers along streets parallel to the one street while still maintaining synchronism in response to a first measure of traffic and in which the local time cycle is further displaced in time in response to a second measure of traffic.

These and further objects are provided by two traffic measuring apparatus which cooperate to change the effect of a master cyclic electrical signal on the local apparatus for switching of the traffic signals. In the preferred embodiment the master signal includes two A.C. signals which differ slightly in frequency and vary in phase with respect to each other. In one case the two traffic measurements cooperate to vary the frequency difference between the two signals comprising the master cyclic signal and thereby increase or decrease the local signal cycle length produced by this master signal as an algebraic function of the two measurements. In another case the offset of the local time cycle of the local controller is controlled by the traffic flow in one traffic direction and in a second interferring traffic direction for varying the phase relationship between the waves as a function of both traffic measurements. A modification of this latter case provides a grid system in which the controllers at each intersection of a grid are automatically offset a desired amount in response to N-S and E-W traffic measurements for example to provide any one of a plurality of offset patterns for any combination of traffic measurements which will favor progressive traffic flow in any direction or combinations of directions into, out of or within the grid so as to move a maximum amount of traffic.

It is in such a grid system, that a change in offset from one grid pattern to another could suddenly result in congestion; accordingly a still further aspect of the invention provides that means be provided for each local controller or a group of local controllers for changing the offset slowly in the shortest direction from one desired offset to another where this offset is a function of two traffic measurements. In particular, groups of controllers along one street have their offset shifted as a group with respect to controllers along a parallel street. In the preferred embodiment these aspects of the invention are provided by individual time displacing means common to each avenue for shifting in phase one of the A.C. signals to thereby shift the local time cycle of the controllers along that street from the master time cycle. The offset change is performed slowly in the shortest direction by comparing one A.C. signal with a newly selected A.C. signal to drive a differential generator in the shortest direction to provide the newly desired A.C. signal.

The scope of this invention is defined in the claims. However, the above mentioned and further objects and advantages of the invention will be apparent to those skilled in the art when considered in reference to the following detailed description of several preferred forms of the invention in which:

FIG. 8 illustrates the intersections of a grid system with local controllers at each intersection.

FIGS. 9A–9H illustrates a plurality of offset timing patterns for a grid system, any one of which may be selected or provided by apparatus shown in FIGS. 10 and 11 for controlling traffic.

FIG. 10 illustrates in block diagram form the preferred traffic grid control system.

Figure 1:
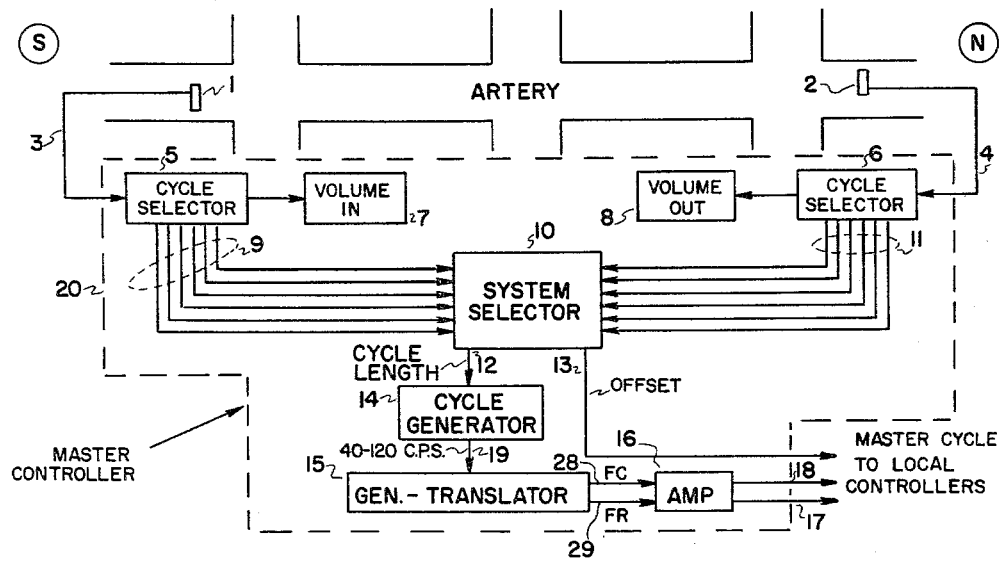
FIG. 1 illustrates in block diagram one prior type of master traffic controller.
Figure 2:
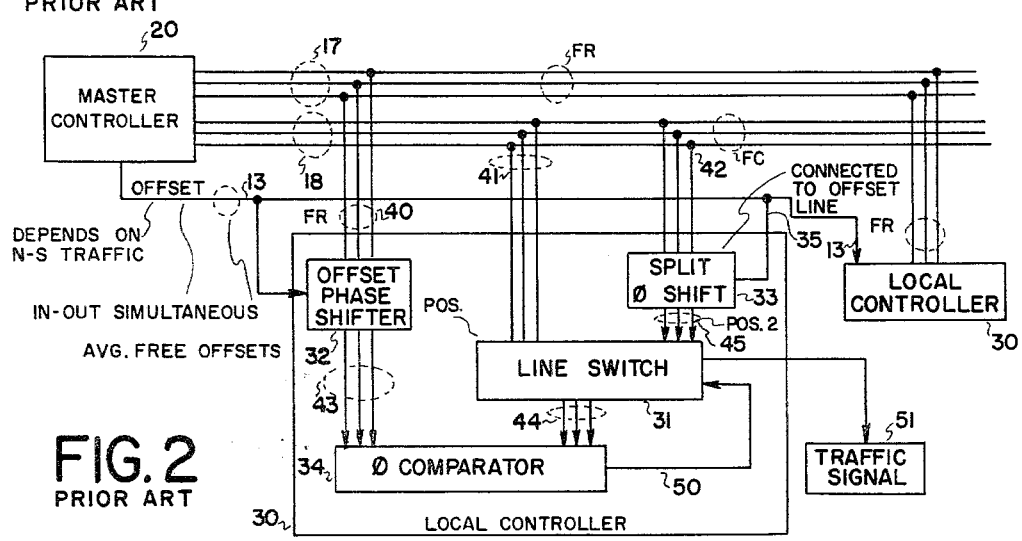
FIG. 2 illustrates in block diagram form a master controller of the type shown in FIG. 1 controlling a plurality of local traffic controllers, one preferred form of which is shown with its essential parts connected.

Since several of the aspects of the invention may apply to a master controller while other aspects apply to a local controller and still further aspects of the invention apply to a master-local traffic control system, one form of a master controller, local controller and master-local system is described in FIGS. 1 and 2 to more clearly show the application of the several aspects of this invention.

*Master-local system of prior art with which the present invention may cooperate*

One form of a master controller as shown in FIG. 1 produces a cyclic electrical master time cycle signal which controls a plurality of local traffic controllers. Each of the local controllers include cyclic switches such as line switches or other step-by-step multi-position switches which step from one position to another through a sequence of positions to control traffic signals to provide a local time cycle of artery and side-street right-of-way traffic signal indications. Within this local time cycle the right-of-way switching occurs at two or more points which are a percentage of the local time cycle. If a point within the master time cycle signal is considered as zero reference time, an offset control signal from the master controller to each local controller so controls the locals as to provide an offset or displacement in time of the local time cycle from the master reference so that a first switching of right-of-way signals occurs at some predetermined time subsequent to the zero reference time to thereby offset the cyclic operation of the local controller a predetermined amount from the zero reference time of the master time cycle. More particularly, all of the switching points which are a fixed percentage of the local time cycle signal are shifted by any offsetting of the local time cycle. However, means are provided for varying at least one of the points a variable percentage of the local time cycle to provide a variation in the split of the cycle.

The offsets of the local time cycle at each local controller may be selected or varied to provide any one of a number of right-of-way time sequence patterns between the respective local controllers. Such patterns may include inbound, outbound or average offset patterns for example in which the right-of-way time sequences between controllers favor the progressive movement of traffic in one or the other or both directions respectively along an avenue.

FIGS. 1 and 2 disclose one such master-local system of the above type with which the preferred forms of the invention may cooperate. The master controller of FIG. 1 is taught by John L. Barker in his U.S. Patent No. 2,542,978 entitled "Traffic Actuated Control Apparatus" as modified by the generator-translator 15 at the output thereof as taught by John L. Barker in his U.S. Patent No. 2,989,728 entitled "Traffic and Other Control Systems."

The master controller of FIG. 1 provides an offset signal on line 13 and a master cyclic electrical signal on lines 17 and 18 to each of the local controllers; the particular cyclic electrical signal on lines 17 and 18 includes two A.C. signal which differ slightly in frequency to coincide in phase within a cyclic time period of the order of a traffic signal cycle (40–120 seconds); the local controller has a phase coincidence responsive means to provide a sequence of traffic signals occurring at a rate determined by the phase coincidence which in turn depends upon the frequency difference. Thus the cyclic switching devices of the local controllers are adapted to complete a local time cycle within the time period of the master cyclic electrical signal although the local time cycle at each controller may be offset from the local time cycle signals of other controllers or from a reference point in the master time cycle.

The general operation of the master controller of FIG. 1 is to sense or sample traffic flow by vehicle detectors 1 and 2, measure this traffic flow at 5 and 6 in terms of traffic volume, speed or density in both traffic directions, compare at 10 the relative measurements of traffic and provide at 12 a master cycle length signal and at 13 an offset signal; the cycle length signal at 12 represents the results of the traffic measurement comparison and then controls the cycle generator 14 and the generator-translator 15 and amplifier 16 to produce a master cyclic electrical signal comprising two A.C. signals on lines 17 and 18 respectively in which the reference frequency on lines 17 may be three phase 400-cycle-per-second A.C. while the control frequency on lines 18 may be three-phase A.C. variable from $400 \pm \frac{1}{40}$ to $400 \pm \frac{1}{120}$ cycles per second A.C. thereby providing a frequency difference of $\frac{1}{40}$ to $\frac{1}{120}$ cycle per second. Phase coincidence between such A.C. signals will occur sequentially at time intervals of the order of 40–120 seconds. This frequency difference is controlled by the cycle length signal on lines 12 and 19. Thus the master cycle signal varies as a function of the traffic measurements. Since the local time cycle is in synchronism with the master time cycle, the cycle length of the local controllers along the artery depend upon the comparison of the two traffic measurements along the artery. Two significant traffic measurements are the relative traffic volume flowing (whether light or heavy traffic) and the comparison of traffic volume in opposite directions. If traffic flow is heavy, the two A.C. signals are displaced in frequency to provide a master cyclic electrical signal having a long time period as for example 120 seconds and vice versa if traffic is light as for example 40 seconds. If there is substantially greater traffic flow in one direction than in the other, the local time cycle right-of-way signals at each local controller are offset a predetermined amount from a reference point and within the time period of the master cyclic electrical signal to aid progression of traffic in the heavier direction.

The preferred master controller includes traffic measuring apparatus referred to as cycle selectors 5 and 6, a comparator referred to as a system selector 10, volume indicators 7 and 8, a cycle generator 14, and a means for generating the master cyclic electrical signal of two A.C. waves referred to as a generator-translator 15, and an amplifier 16.

Vehicle detectors 1 and 2, are positioned within or adjacent the roadway to provide an electrical or other signal to cycle selectors 5 and 6, over lines 3 and 4 in response to vehicle passage in a northerly or southerly direction respectively. Such detectors may be of the magnetic, photoelectric, radar, pressure or any other type as is well known.

The cycle selectors of FIG. 1 as described in U.S. Patent 2,542,978 compute the traffic volume in vehicles per unit of time and are adapted to select one of a scale of traffic cycle length output signal positions at 9 and 11 in response to various levels of volume within a scale of volumes. The system selector 10, as described in this patent, compares the two selected cycle length signals and provides for the selection of the higher (or lower if desired) of two cycle positions or signals selected individually at 9 and 11 by the two traffic actuated cycle selectors from their respective scales of cycle positions, where different cycle positions are selected by the two cycle selectors; furthermore the system selector 10 provides for selection of the same cycle position or signal where corresponding cycle positions are selected by the two cycle selectors. The master cycle length signal selected is indicated at the output on line 12.

The system selector 10 also provides a system offset signal at 13 by selecting between inbound offset, outbound offset or average offset in accordance with the relative positions of the two cycle selectors.

In the operation of the cycle selector apparatus 5 and 6 from its broader aspects the inbound and outbound traffic streams are respectively in effect measured or counted over a time period and during such time period the individual cycle selectors remain in one position so that the master cycle length signal at 12 does not change and the local time cycle of the local controllers remains unchanged. Near the end of such traffic sampling time period the individual cycle selectors determine whether to remain on the same position or cycle or to change to a different position representing a longer cycle or to a shorter cycle as represented by one of the lines 9 and 11 in accordance with the traffic counted, for example. If the traffic counted is substantially the same as in the preceding sampling time period, the cycle selector remains in the same position or cycle but if the traffic has increased substantially the cycle selector will select the next higher or longer cycle in the series, or if the traffic count has decreased substantially the cycle selector will select the next lower or shorter cycle in the series for the next sampling time period. At the end of each sampling time period the counting of traffic is reset and another sampling time period is started.

Each cycle selector has a number of diffrent cycles to select from. The patent referred to illustrates six cycles or cycle positions A to F for example which we have shown as lines 9 and 11 although it is obvious that more or less could be provided if desired or the system could be linear. Alternatively other forms of measuring apparatus may be used as for example the type shown in U.S. Patent 2,932,003.

The system selector 10 provides a means of selecting among the inbound and outbound offset systems at the local controllers in accordance with the positions of the inbound and outbound cycle selectors 5 and 6 respectively. For example if the inbound and outbound cycle selectors are both on the same or corresponding cycle positions, indicating substantially the same traffic flow in each direction, the system selector apparatus would select the average offset by providing an appropriate signal on line 13. Similarly, if the inbound and outbound cycle selectors are not more than one cycle position apart the system selector will continue to select the average offset. On the other hand, if for example the inbound and outbound cycle selectors are two or more cycle positions apart (representing a difference in volume), the system selector will select an offset favoring the higher of the two traffic volumes. Thus if the inbound cycle selector is two cycle positions higher than the outbound cycle selector a signal will be produced on line 13 to select the inbound offset at each of the local controllers, but if the outbound cycle selector is two or more cycle positions higher than the inbound cycle selector the signal on line 13 will select the outbound offset at the local controller.

The cycle generator 14 may include for example an audio oscillator producing a signal at 19 which may be varied from 40–120 cycles per second in dependence upon the system cycle length signal at 12. Thus if the traffic from north to south is greater than from south to north, line 11 rather than line 9 will control the system selector to provide an output at 12 which will produce a cycle length signal sufficiently long (as for example an 80-cycle-per-second signal) to pass the north-south traffic.

This 40–120-cycle-per-second system cycle length signal at 19 thus controls a differential generator in the generator-translator 15 to produce two three-phase voltages FR and FC on lines 29 and 28 which differ slightly from each other in frequency in dependence upon the frequency of the 40–120-cycle signal at 19. The amplifier 16 maintains these two voltages separated to provide corresponding outputs at 17 and 18.

Figure 3:
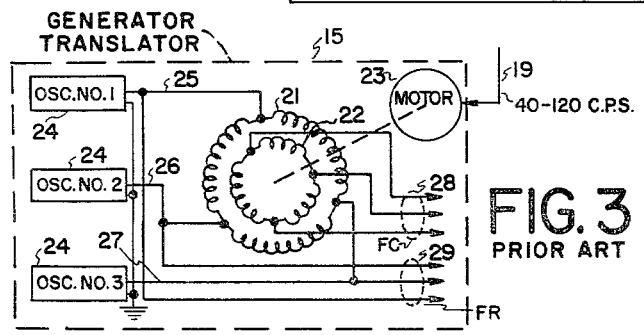
FIG. 3 shows a partial schematic drawing of the generator-translator of FIG. 1.

As shown in FIG. 3 the differential generator as shown includes a stator winding 21 and a rotor winding 22 in which the rotor winding is driven by a motor 23 at a variable rate depending upon the frequency of the system cycle length signal on line 19.

Three oscillators 24 each provide one of three-phase, 400-cycle-per-second signals on lines 25, 26 and 27 which are connected to the stator 21 at substantially 120-degree spaced intervals. The three-phase output signals from the rotor on lines 28 and will differ slightly in frequency from 400 cycles per second depending upon the speed and direction of rotation of the motor 23 as for example the control frequency FC on lines 28 may vary from $400 \pm \frac{1}{40}$ cycles per second to $400 \pm \frac{1}{120}$ cycles per second.

FIG. 2 further describes the operation of Barker's master-local system in which details of a local controller are shown associated with the master controller 20 of FIG. 1. The master cyclic electrical signal as represented by FR and FC, 17 and 18, and the master offset control signal 13 are connected to a system of local controllers. The offset line 13 is shown as a single line although there may exist a separate line for each offset.

The local traffic controller 30 includes a line switch 31 or other cyclic switching device having at least two positions, a means for displacing the master cyclic electrical signal in time at a selectable offset phase shifting means 32 to shift the local time cycle in response to the offset called for on lines 13, a means for determining the time at which a second switching of right-of-way occurs is referred to as a split determining phase shift means 33, and a means for stepping the cyclic switch from one position to another is referred to as a phase comparator 34. In the first position of the line switch, the three phase A.C. signal FC on lines 41 pass through the line switch contacts to lines 44 where the signals FC will be compared with the shifted A.C. signal FR on lines 43 with the result that phase coincidence will occur at a time displaced from a master reference or zero time as determined by the phase shift provided at 32 and this coincidence pulse on line 50 will step the cyclic switch into position 2. In position 2 of the line switch, the A.C. signal FR on lines 43 is compared with the A.C. signal FC on lines 45 so that a second phase coincidence occurs at a time determined by the phase shift provided at 33 to switch the cyclic switch back to position 1 thereby completing a cycle of right-of-way signal at 51. If the time at which phase coincidence would occur between FR and FC as non-shifted, as at the master for example on lines 17 and 18, is considered as a reference zero time, then the local time cycle is shifted at 32 and may be split at 33 and is in synchronism with the master.

The reference waves FR on line 17 are connected over lines 40 to the offset phase shift means 32. The N-S offset control signal on line 13 from the master controller, controls the offset means 32 to provide at its output on lines 43 a three-phase (or if desired a single phase) reference signal which is shifted or offset in phase a desired amount from the input at 40. The preferred form of offset phase shift means 32 at each local controller include a group of phase shift potentiometers of the type shown in FIG. 11 each of which has a stator connected in delta to the three phase signals and two rotor contacts which are manually adjustable to provide a single phase output whose phase is varied by the position of the rotor contacts. However, for convenience, three phase lines are shown at 43 and other places throughout the drawings for convenience while single phase is generally sufficient. Relay and other switch contacts permit the connection of the rotor contacts of a selected one of the potentiometers to the output leads 43. Thus if the master offset signal on lines 13 calls for inbound offset, one potentiometer is selected and the output of FR on lines 43 will be shifted a different adjustable amount. Of course other forms for phase shifters including differential generators and electronic type may be used as is well known.

While the split phase shift means 33 is also controlled by the offset signal 13, a fixed phase shift is sufficient. The result of the above circuitry is to provide two successive phase coincidence signals on line 50 to step the cyclic switch 31. The frequency or rate of phase coincidence signals on line 50 depends upon the frequency difference between FR and FC and determines the length or rate of the local time cycle. Considering $t_0$ as the time at which phase coincidence would occur between the two waves at 40 and 41, then at time $t_1$ phase coincidence will occur at 34 between the waves at 43 and 44 where the difference in time between $t_0$ and $t_1$ depends upon the amount of phase shift produced at 32 and determines the offset or displacement in time of the local time cycle.

The controller will rest in position 2 of the line switch and maintain a desired traffic signal (such as side street green, for example) at 51. Subsequently, coincidence again occurs between the waves FR and FC on lines 43 and 44 to step the controller from position 2 back to position 1. However the waves at 44 in position 2 of the line switch 31 are derived not from lines 41 but from lines 42 through the split phase shifter 33, lines 45 and position 2 of the line switch to 44.

The time at which coincidence occurs in the second position of switch 31 determines the "split" or apportionment of the local time traffic signal cycle between artery green and side street green at 51. The traffic signal cycle length is the time required for the controller to leave a particular position (artery green position 1 of line switch) and to leave that position again, while the "split" is the fraction or percentage of the local time cycle which is devoted to right-of-way on each of the respective streets of the intersection.

*Dual variation of offset, split or cycle length as function of two traffic measurements*

One important aspect of this invention is the provision of apparatus which will automatically change one of the characteristics of the traffic signal cycle, as for example the offset, split or cycle length, in response to the cooperative joint action of a plurality of traffic conditions or measurements. In particular it is desired to vary the offset or split a predetermined amount in response to one traffic condition and to increase or decrease that amount in response to another traffic condition; also, it is desired to vary the cycle length algebraically as a function of two traffic measurements.

*Varying of offset or cycle length by cascaded phase shifters controlled by traffic measurements*

Figure 4:
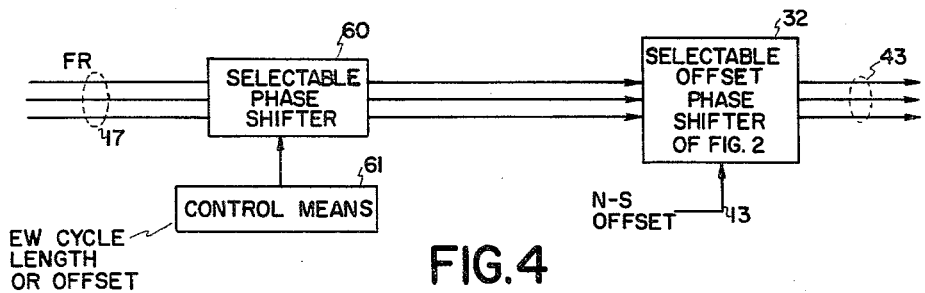
FIGS. 4–7 illustrates in block diagram form several important aspects of the invention as applied to a local traffic controller of the type shown in FIG. 2 but not limited thereto.

FIG. 4 illustrates one form of the invention for varying the time point at which traffic signal switching occurs in a local traffic controller of the type shown in FIG. 2 with respect to the time period of a master cyclic electrical signal. This apparatus serves to vary the offset of the local time cycle or the offset point of the local controller (from zero point) in response to a plurality of traffic conditions. FIG. 4 shows the offset phase shifter means 32, N-S offset control 13, three-phase input references lines 17 and three-phase output lines 43 all as described in the local controller of FIG. 2. A control means 61 and an additional phase shifter 60 controlled by the control means 61, are connected so that the three-phase output signal at 43 will be an offset reference signal wave of the same frequency as at 17 but which is varied in phase a first amount either leading or lagging in response to control means 61 and in which the wave is further shifted in phase to increase or decrease the total phase shift in response to the N-S control 13; this control 61 may include any traffic measurement as for example the speed of an approaching vehicle. Also the invention is not limited to a N-S control at 13 but may be any other traffic measurement.

Thus the total phase shift at 43 is a function of both traffic measurements and accordingly the local switching time cycle is offset from the master. Accordingly each traffic measurement individually modifies or controls the offset. Thus one traffic measurement may tend to increase the offset while the other tends to decrease it; alternatively both traffic measurements may tend to increase or decrease the offset. In addition the individual measurements may each vary the offset linearly each having equal control or one may provide a greater change than the other for example depending upon the type of system to which the invention is applied. This concept of providing apparatus which will permit an offset which can be varied by a plurality control means has importance in a traffic controlled grid system and other systems as will appear subsequently in FIGS. 5, 10 and 11. In such a grid system, control means 61 may be an east-west control which will vary the phase of the reference waves FR in proportion to the east-west traffic volume, density, or speed. In addition in a grid system (as will appear in FIGS. 10 and 11), if a group of parallel N-S avenues are controlled as provided in FIGS. 1 and 2, the insertion of a means 60 and 61 *for each avenue* (rather than each controller as described in FIG. 4) will provide that the offset of each controller in such a grid system is controlled by both N-S and E-W demand. In such a case the offset of each controller will control its traffic signal to provide any combination of traffic signal progressions favoring for example N-S and E-W traffic; also S-N and E-W may be favored; or N-S and W-E; or S-N and W-E may be favored in various degrees as locally adjusted. Also an offset may be provided for all controllers which will treat all directions of traffic flow equally. In addition simultaneous operation may be called for.

In FIG. 4, variation is provided by two algebraically additive or cooperative variations in phase of FR in a single local controller. However, it is equally apparent that the same result may be obtained by variation of FC or FC and FR and that the invention has application to more than one controller as in a grid system. In addition the system of FIG. 4 is equally applicable to vary the split or to vary offset and split.

While the phase shifters and traffic measuring means of FIG. 4 may have any one of several forms as has been discussed previously, if the phase shift means 32 or 60 include a plurality of resistance potentiometers as has been suggested, there may be a selection of an individual potentiometer in each of such phase shifters in which the individual potentiometer has been manually adjusted to provide an output phase which is proportional to the value of traffic volume, for example, represented by a particular output line from a system or cycle selector which caused this selection. Accordingly the total phase shift in such a system is proportional to the algebraic sum of the two traffic measurements.

Alternatively the cascaded phase shifters 32 and 60 of FIG. 4 may be differential generators or other means while the traffic measuring or comparison means may include apparatus for providing a voltage proportional to the traffic volume for example. Apparatus may then be provided to displace the rotors of such generators in their angular position in proportion to the voltage output of their associated traffic measuring apparatus so that the total phase shift is proportional to the algebraic sum (one phase shift may lead and the other lag or both may lead or lag) of the two voltage or two volume measurements for example.

Furthermore if the phase shifters of FIG. 4 are differential generators and the rotors are continually driven at a slow rate in proportion to the traffic measurements, a system would be provided in which the cycle length (frequency difference) is the sum of the two measurements.

*Applications to individual intersection or groups of intersections*

FIGS. 5A, 5B, 5C and 5D illustrate further modifications and applications of the invention as broadly described in FIG. 4. For example as in FIG. 5A, where there are a plurality of intersections along an artery in which local controllers 71 and 72 at each intersection are under the control of a master controller 70 which supplies the desired traffic cycle length, split and offset information, at each of the local controllers, over a plurality of lines shown only as 73, there may be a particular critical intersection. In the vicinity of such an intersection, vehicle detectors and cycle selectors 74–77 may be positioned to measure east, west, south and north traffic volumes and system selectors 78 and 79 may be connected to derive an E-W volume signal on line 82 and N-S volume signal on line 81 which are each connected to the local controller 72 at the critical intersection to shift its offset an additional (or less) amount within the time period of the master cycle than that provided by the master controller offset signal on line 73 by the use of phase shifting means as prescribed in FIGS. 4, 6, 7 and 11. Thus the progression in time of the right-of-way signals at 83 and 84 along the artery for example varies as a function of the master offset signal and is further modified by the relative E-W traffic volume and N-S traffic volume.

Figure 5A:
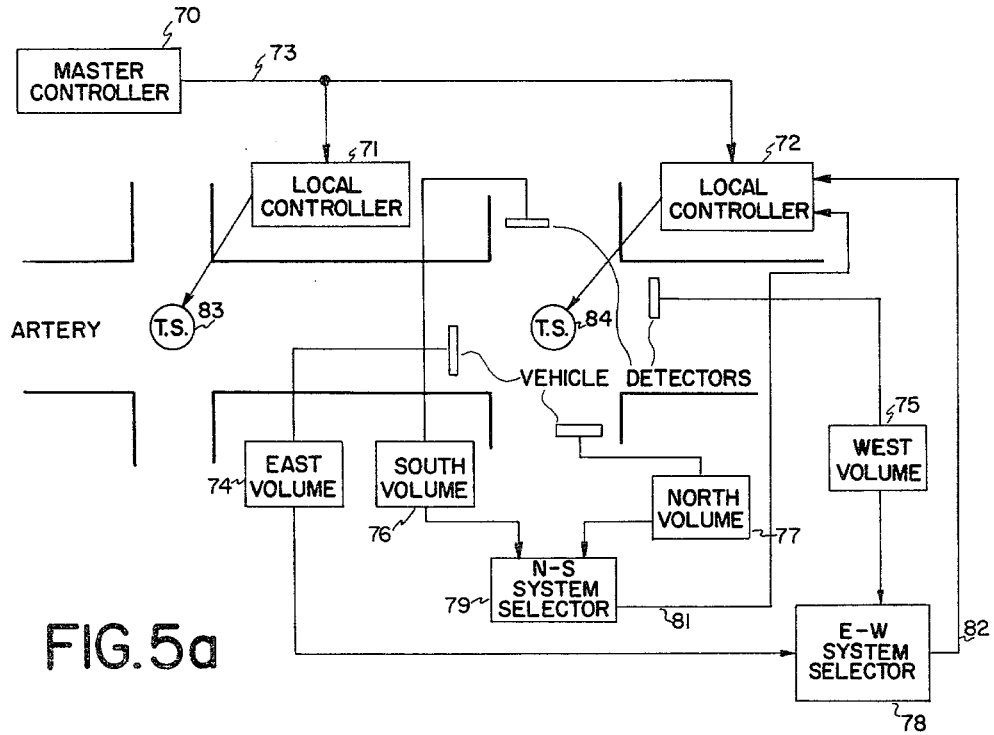
Figure 5B:
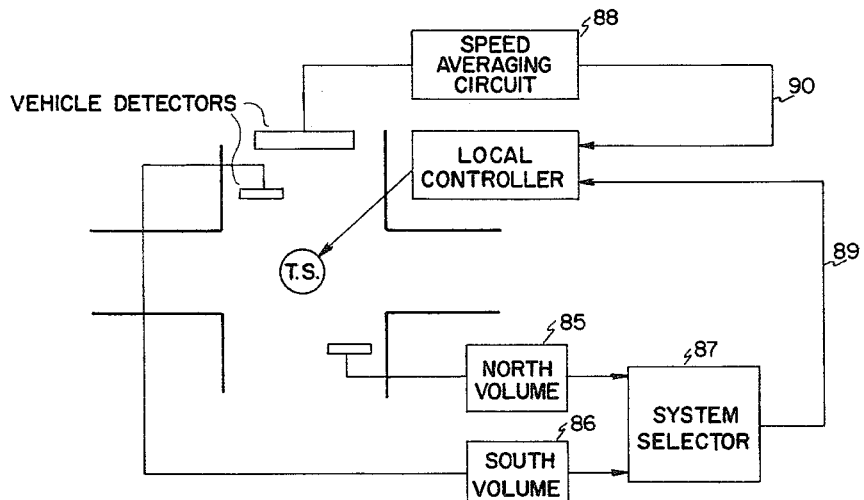

FIG. 5B illustrates another application of the invention at an intersection. Detectors are positioned within the roadway to measure traffic volumes at 85 and 86 in a north and south traffic direction and compared at 87; the average traffic speed is measured at 88 for example. The output signals from these measuring circuits are connected over lines 89 and 90 to the local controller to cooperatively shift the offset at the intersection. For example, if the traffic volume flowing north is substantially greater than that flowing south, the offset of the local controller 80 will be shifted or displaced in time a first amount in a leading direction from a reference point in the master cycle of the master controller (not shown) or from the offset point of another local controller to favor the northbound traffic; however if the average speed of vehicles moving in the N-S traffic direction is low, then the speed control signal on line 90 will increase the offset from said first amount to permit the vehicles to pass through the intersection; alternatively if the average speed is high the opposite effect occurs with the first amount of offset being decreased since the high speed vehicles do not require a large offset.

Figure 5C:
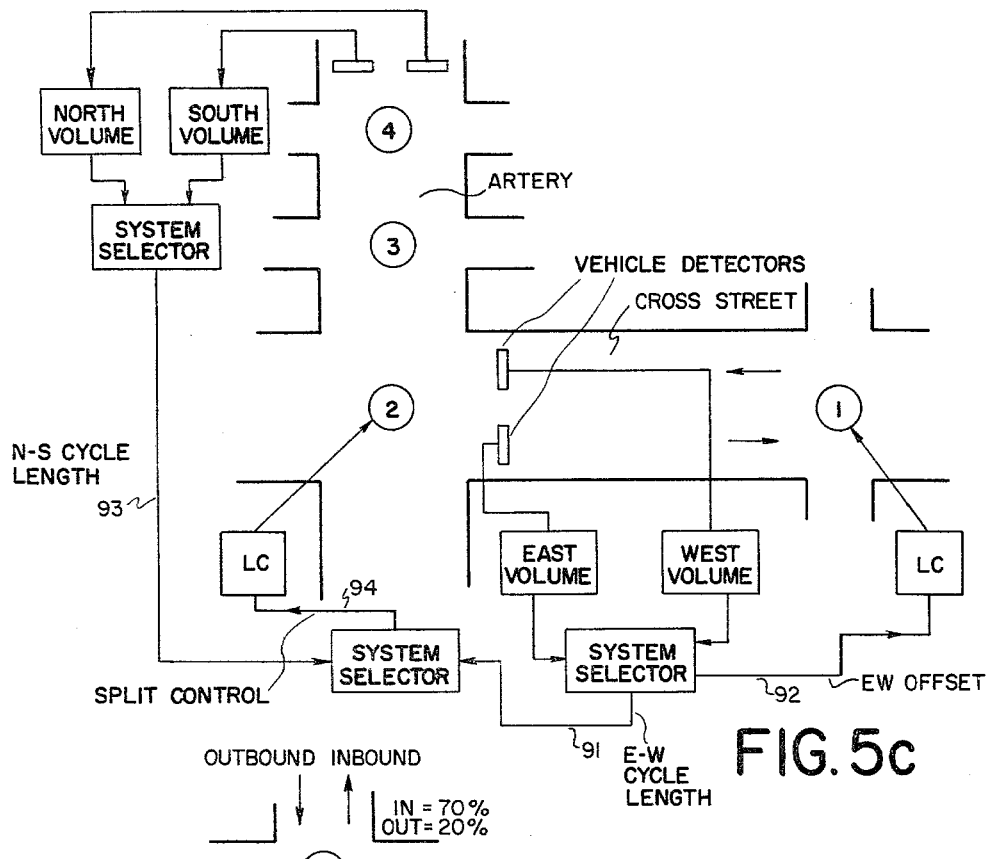

FIG. 5C illustrates another application of the invention. In this case, assume that there is an artery in which at least one cross street has substantial traffic. At the intersections there is a local traffic controller and the offset at each of the controllers along the artery will be controlled by a master controller (not shown). Thus the traffic signals at 2, 3 and 4 will be offset from each other for either an inbound or outbound or average progression along the artery for example as called for by the master controller.

Thus the signal at 2 can be considered as having several possible offsets with respect to the signal at 1 on the heavily traveled cross street; in general these offsets may not aid the cross street traffic since the system is basically designed to help the artery traffic. Accordingly, traffic detectors are positioned within the east-west cross street and connected to two-cycle selectors, the output of which is connected to a system selector to provide an E-W cycle length at 91 and an E-W offset signal at 92. Similarly traffic flow is measured along the north-south artery by traffic detectors, two cycle selectors and a system selector to provide a N-S cycle length signal at 93. The cycle length signals on 91 and 93 from the two system selectors are compared in an additional system selector to provide a system cycle length signal on line 94 for controlling the traffic signal at traffic signal 2. Thus the connection of the E-W offset signal on line 94 from the E-W system selector is connected to the local controller to shift the offset of signal 1 with respect to signal 2 to favor cross street traffic; in addition the system offset signal on line 94 from the system selector is connected to the local controller at signal 2 in proportion to the relative E-W versus N-S traffic measurements.

Figure 5D:
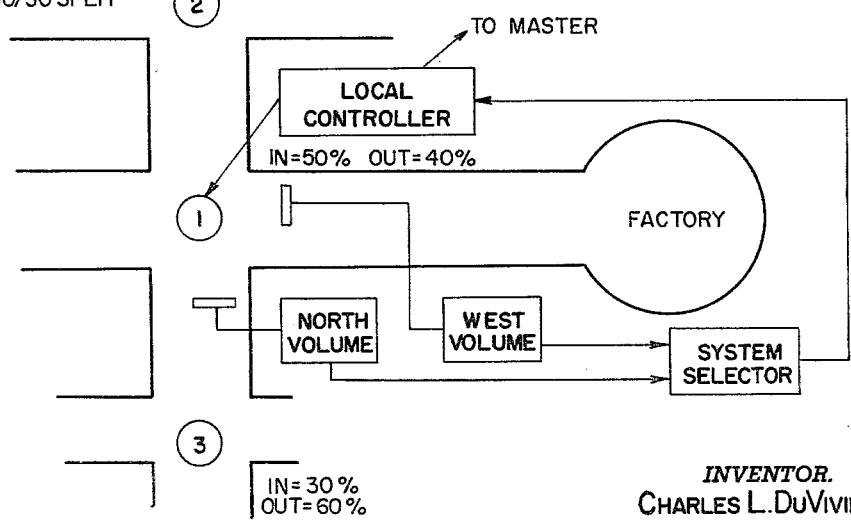

A further application of the invention is shown in FIG. 5D in which there is an artery and a cross street having a factory thereon or being otherwise subjected to periodic heavy traffic flow. In this case the object is to permit traffic to flow along the artery in a normal progression as would be provided by a master controller but to permit traffic leaving the factory or cross street to enter the artery at signal 1, turn right (or left) and continue on the artery to pass through the #2 intersection without stopping; therefore the offset of the traffic signal at 1 must be adjusted to permit cross street or factory traffic to fit into the normal artery progression.

In normal operation for artery progression in an inbound direction, the signals at 1 will be offset (leave artery green) at 50% of the cycle for example, the signal at 2 will be offset to 70% of its cycle and the signal at 3 will be offset at 30% of its cycle for example. For outbound progression along the artery, the signal at 2 will be offset to 20% of its cycle the signal at 1 will be offset to 40% of its cycle and the signal at 3 will be offset 60% of its cycle. Thus considering the signal at 1, as being adjusted for a 50/50 split of green between the artery and the cross street, it will be green on the artery for either the first 50% of its cycle (if inbound offset is called for) or the last 10% and first 40% of its cycle (if outbound offset is called for). Thus there will be green on the cross street for the last 50% of the cycle or from 50–90 percent of the cycle.

Therefore vehicles from the factory which turn right or left at intersection #1 will normally be stopped at intersection #2 or #3. However, by comparing the relative traffic flow on the cross street and artery, the offset at #1 intersection may be switched to a different value as for example 0% under inbound conditions so that the cross street traffic now forms part of the artery progression in the inbound direction. Of course other offsets may be called for at #1 intersection in dependence upon the relative traffic flow along the artery and cross street. For example the offset at #1 intersection may be switched to permit progression in the outbound directions for those turning left. Alternatively the offset at #1 may permit left and right turns equally well.

FIGS. 5A–5D have disclosed several applications of the invention. However, the invention is not limited to these applications since the applications of this invention are too numerous to completely describe. While these FIGS. 5A–5D have been shown only in block diagram the preferred offset or split control of these controllers is performed in the manner shown in FIG. 4 and subsequently in FIGS. 6 and 7. Thus the control of offset by the individual traffic measurements are independent, and the offset may be changed by cross street traffic independent of artery traffic or even though the artery traffic or master control is also calling for a change in offset.

FIG. 6 controller

Figure 6:
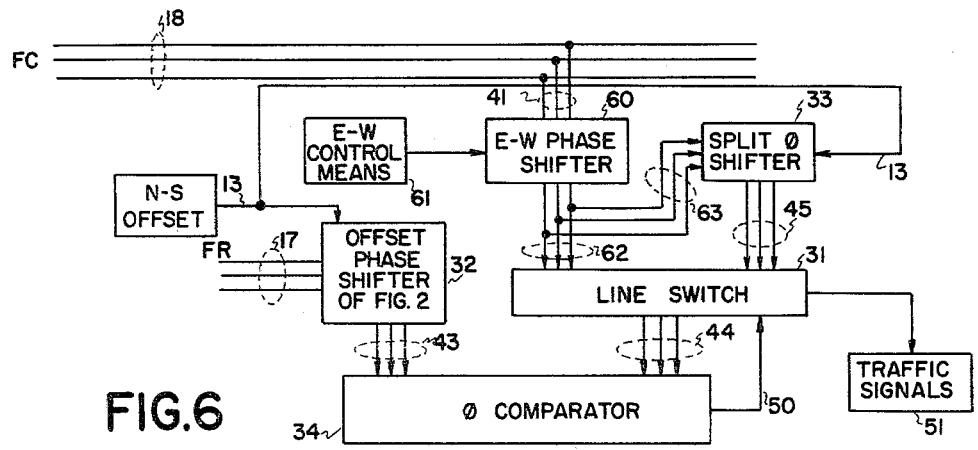

Fig. 6 illustrates a further more complete modification of a local controller of the type shown in FIG. 2 in which the three-phase waves FR and FC may both be varied to vary the offset; this is in contrast with FIG. 4 in which only one wave (FR or FC) is varied in phase by two control means. The A.C. wave FC on lines 18 and 41 is shifted in phase at the output lines 62 of the east-west phase shifter 60 in response to an E-W control means 61 as for example a computer of density, volume or average speed of vehicles moving in an east-west direction. A preferred form of such an E-W control means includes two cycle selectors and a system selector as shown in FIG. 1 to measure the relative traffic volume in an E-W direction. These means while shown with the local controller would normally be remotely located and may be a part of a master and may control more than one controller as will be shown in FIG. 11.

The A.C. wave on lines 17 is also shifted in phase at 32 an amount which provides an A.C. signal at 43 which is either a linear or step function of the N-S offset signal on line 13.

Thus the two waves FR and FC, as so shifted in phase at 43 and 44 (from 62) will, in position 1 of the line switch, coincide at the comparator 34 at a time depending upon the total phase shift of both waves in response to both E-W and N-S traffic demand. The total phase shift may be the sum, or difference of the two phase shifts or some other function. In response to such phase coincidence, the comparator 34 produces a signal on line 50 to step the line switch 31 into position 2 at an offset time which is displaced from a reference point as for example the time of coincidence between FR and FC on lines 17 and 18. In position 2 a further comparison is made between FR on lines 43 and FC as phase shifted on line 63 and as further phase shifted at the split phase shifter 33 by the north-south offset control of line 13 to cause the line switch to step back to position #1. The split is thus controlled by the same lead 13 as is offset phase shifter 32. However separate split control may be had if desired as shown in FIG. 7.

Figure 7:
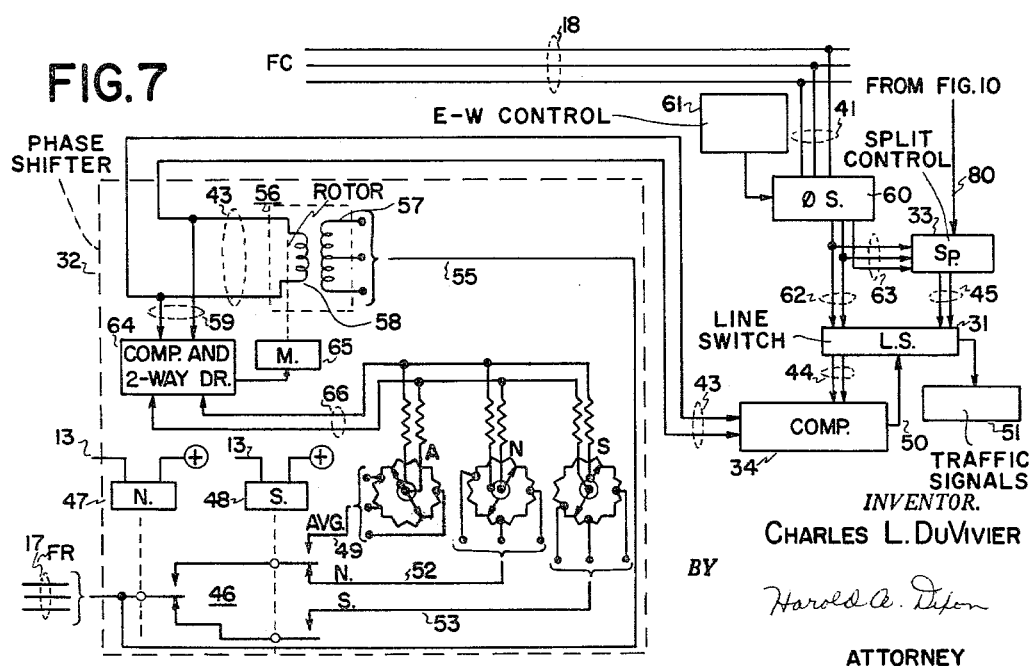

FIG. 7 controller features

FIG. 7 illustrates another modification of the invention similar to FIG. 6 with the exceptions that the split control 33 is regulated or controlled by a split control lead 80 rather than from the N-S offset lead 13 and the phase shifter 32 is shown in more detail to provide a slow change in offset in the shortest direction. The lead 80 will be connected to receive a signal which represents the grid system split signal which results from a comparison of E-W traffic with N-S traffic as is more clearly shown in FIG. 10. In FIG. 10 both N-S and E-W traffic volume is measured and compared to derive an N-S cycle length signal and an E-W cycle length signal in which the signals are compared in a system selector to derive both a grid system split signal and a grid system cycle length signal. If the E-W traffic flow is substantially the same as N-S traffic flow the system split would be considered average and a signal will exist as 80 which will shift the phase of FC at 33 to call for a 50–50 split between artery and side street green. If E-W traffic flow is greater than N-S traffic flow, a signal will be present at 80 to call for a split which favors E-W traffic. If N-S traffic flow is greater than E-W traffic flow, the opposite result will occur.

The phase shifter 32 of FIG. 7 is shown in detail to provide a slow phase shift in the shortest possible direction in response to N-S offset changes. This circuit includes a switch 46 which will connect the three phase preference signals FR on lines 17 to either lines 49, 52 or 53 depending upon whether the northbound offset relay 47 or the southbound offset relay 48 or both are energized from the N-S offset lines 13. Thus either one of three three-phase potentiometers are connected to the three-phase reference signal at 120 degree spaced points. The single rotor outputs from these potentiometers are connected in parallel through resistors or other decoupling means to lines 66 which form an input to a comparator and two-way drive means 64. The input on lines 17 also feed the three-phase stator 57 of a differential generator 56. The rotor output 58 of the generator on lines 43 is connected to the phase comparator 34 as in FIG. 6. In addition the rotor output is connected over lines 59 to a phase comparator in 64. These two wave inputs to comparator 64 are then converted to pulses to indicate positive or negative portions of the cycle for example. Comparison of the pulses (whether positive or negative) thus indicates whether the two signals are greater than or less than 180 degrees spaced in phase. Accordingly an output is derived from 65 to drive motor 65 in one or the other (two-way) direction slow, as through gearing, to provide an output signal on lines 43 which is the proper phase selected by the potentiometers and offset relays.

However, it will be appreciated that the phase selected at 43 is only one factor in the determination of the offset of the controller in FIG. 7. The other factor is the phase shift produced on lines 62 by the E-W offset phase shifter 60.

Figure 11:
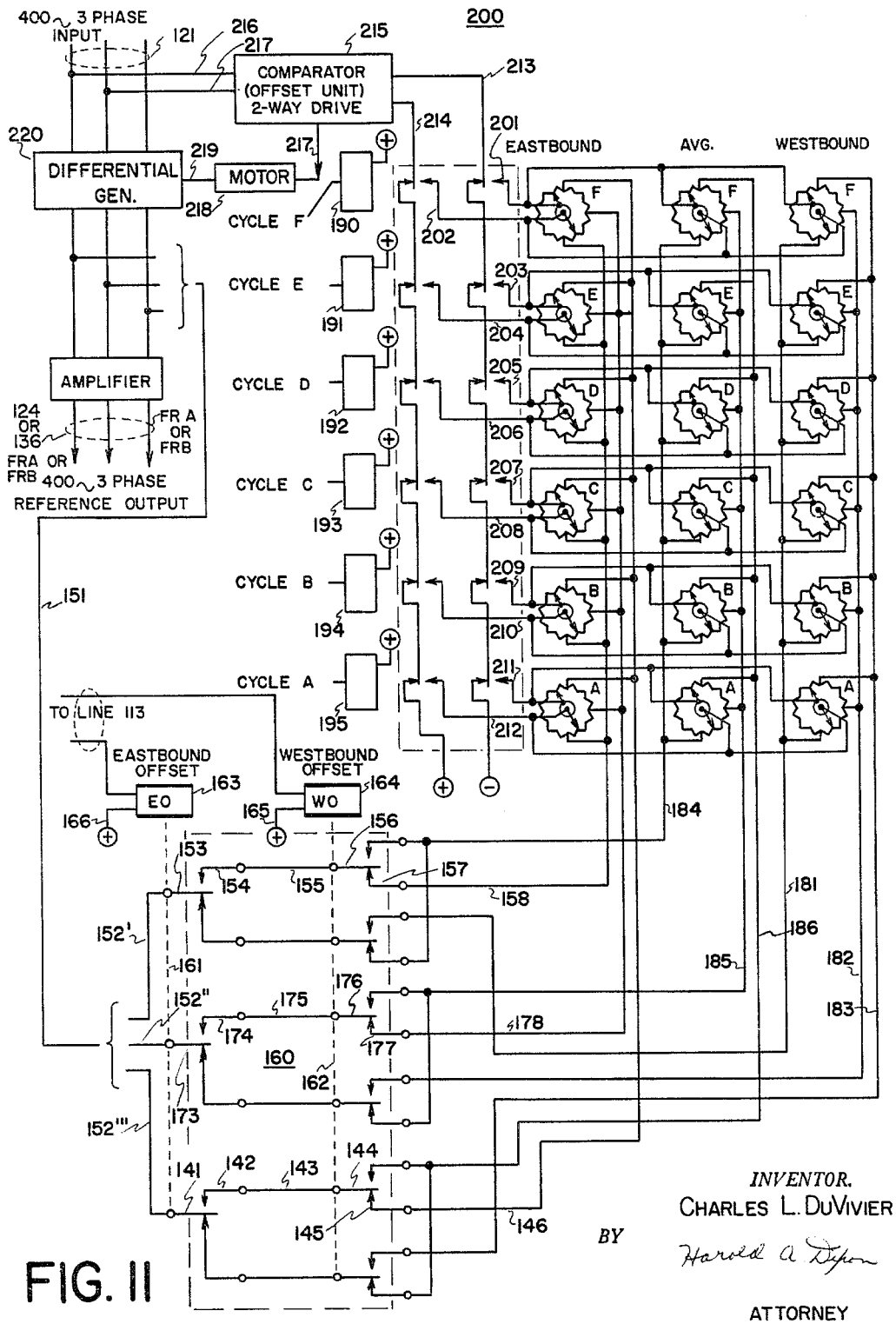
FIG. 11 is a schematic drawing of the transposer or time displacing means of FIG. 10 showing its association with the system of FIG. 10 in more detail.

This latter phase shifter as will be described in FIG. 11 may be common to a plurality of controllers and may be part of a master controller. Therefore similar apparatus may be used to provide a slow phase change for the signal on lines 62. In particular, the comparator 215 of FIG. 11 is designed just for this purpose. In addition, if both the E-W and N-S control change the phase of a single wave, a single means could be used to slowly vary the phase in the proper direction for this signal as twice shifted.

Grid systems

FIG. 8 shows a traffic grid system including a plurality of intersections having avenues A, B and C running in a north-south direction and streets 1, 2 and 3 running in an east-west direction with local controllers at each intersection for controlling traffic thereat.

FIGS. 9A–9K disclose some of the desired offset time relationships between local traffic controllers at the various intersections of a grid system in which vertical lines represent parallel avenues and the horizontal lines represent parallel streets and in which the offset of each local controller is legended in percent of the time period of the traffic signal cycle; apparatus for producing these results will be shown in FIGS. 10 and 11.

By arranging the local controllers along avenue A in FIG. 9A to offset their local traffic signal time cycle at 0, 10 and 20 percent subsequent to a reference time or zero time in the master time cycle, a southbound preferential offset is provided for traffic on avenue A. A similar preference is provided on avenues B and C while the cross streets are arranged for simultaneous operation in their E-W direction. Thus if the master or local time cycle is 100 seconds, the traffic controllers at the successive intersection will turn (or leave) green (or some other color) at 10, 20 and 30 seconds, respectively after a common zero time.

FIG. 9B illustrates an arrangement in which the local traffic controllers are offset to provide southbound and eastbound preference.

FIG. 9C illustrates an arrangement of controllers having the southbound and westbound preference.

FIG. 9D provides northbound preference with E-W simultaneous; FIG. 9E provides northbound and eastbound preference; FIG. 9F provides northbound and westbound preference.

In many cases, it is desirable that a preferential offset be provided which favors both northbound and southbound traffic equally well or favors eastbound and westbound traffic equally well; such an offset is referred to as average N-S or E-W offset.

Thus FIG. 9G provides a southbound preferential offset with an average east-west preference in which the signals at adjacent controllers are displaced ten percent in a southbound direction along the avenues and in which the signals at adjacent intersections in an east-west direction are displaced in time fifty (50) percent of a cycle to permit traffic to flow equally well both easterly and westerly.

FIG. 9H is similar to FIG. 9G but provides a northbound offset rather than southbound and also in average east-west offset. Of course two other figures could be shown reversing FIGS. 9G and 9H to provide the average offset in a northbound or southbound direction.

In addition FIG. 9K shows the percentage offset of the signals at the various intersections to provide an average offset in both the north-south traffic direction and the east-west traffic direction.

While the above drawings have reference to two-way streets, it is obvious that the invention has application to one-way streets. Completely different grid offsets may be provided for a grid of one-way streets or the offsets on two one-way streets may be controlled in the manner of one two-way street. In addition, the percentage offsets shown in FIG. 9 at each intersection are for the purpose of illustrating the concept of the invention while the actual percentage offset at any intersection in a grid will depend upon a plurality of well-known factors as for example the distance between intersection and the desired speed of the vehicles.

FIG. 10 shows apparatus in block diagram form for controlling a grid system according to one aspect of the invention to attain any one of a multitude of offset patterns as for example those shown in FIG. 9. Along each of the avenues is apparatus individual to that avenue for displacing the local time cycle of all the local controllers along its respective avenue with respect to an adjacent avenue; this apparatus is referred to as transposers 120 and 130 or offset time displacing means; these transposers operate to change the phase (and thereby the offset) of the reference frequency FR at each controller along each avenue in response to E-W traffic demand. The circuit for one such a transposer is schematically shown in FIG. 11.

The local controllers at the intersections of the grid are legended as A–1, B–2 etc. to indicate that the controller is at the corner of A-avenue and street 1 and B-avenue and street 2 in which avenues A, B and C are parallel and run north and south while streets 1, 2 and 3 are parallel and run east and west as shown in FIG. 9.

Traffic detectors (not shown) are positioned within, adjacent or above the roadways at selected points to sample traffic flowing north, south, east and west. These detectors when actuated by a vehicle provide an output signal which then control the respective cycle computers 100–103 to determine the traffic volume, speed or density of traffic flowing into the grid in the four directions. For example, a traffic detector positioned in an N-S street and actuated by traffic flowing south will provide a signal at the south cycle selector 101.

Other measuring points may exist in which flow out of the grid is sampled; the overall object being to obtain a representative or average measure or indication of traffic in the grid.

North-south and east-west system selectors 108 and 109 (identical with 10, in FIG. 1) compare the relative volumes or other measurements of traffic flow to determine the time length of N-S and E-W cycle length signal required as well as the desired N-S and E-W offset. For example, if the north volume on line 104 is substantially greater than the south volume on line 105, a signal is present on line 111 which will provide a traffic cycle length signal sufficiently long to accommodate the northbound traffic. Similar results occur at 112 in dependence upon whether the traffic measurement flowing east indicated on line 106 is greater than the flow west as indicated on line 107.

While lines 104–107 are indicated as single lines it will be appreciated they may each include a plurality of lines as shown at the output from the cycle computers of FIG. 1.

The system selectors 108 and 109 also provide preferential offset signals at 110 and 113 in response to N-S and E-W traffic measurements respectively. For example, an average offset signal is produced at 113 in response to substantially equal east and west traffic measurement whereas a westbound offset signal is produced in response to greater westbound traffic flow and conversely an eastbound offset signal is produced in response to substantially greater eastbound traffic flow. Similarly average, northbound and southbound offset signals are provided on line 110 in response to substantially equal or greater northbound or southbound traffic flow respectively.

These offset signals control the local controllers of the grid system. Accordingly depending upon which two offset signals are called for, the controllers of the grid will provide one of the offset patterns shown in FIG. 9. The absence of one of these offset signals or some other control signal may provide simultaneous operation.

System selector 114 (similar to 108, 109 and 10) is provided to compare the desired N-S and E-W cycle length signals of 112 and 111 to provide the desired overall system cycle length signal at 115 as well as providing a system split signal on line 80 (the use of which was discussed in FIG. 7).

The system cycle length signal at 115 controls the generator-translator cycle generator and amplifier at 116 (which is the type clearly shown in FIG. 3) to produce two three-phase waves FC and FR (117 and 118) which differ slightly in frequency in dependence upon the system cycle length signal called for on line 115.

Now looking at the three local controllers on avenue A (A-1), (A-2) and (A-3), each controller has three inputs—FRA on line 117 (avenue A three phase reference frequency), FC on line 118, and the N-S offset control signal from line 110. Each of these three local controllers employs apparatus as in FIG. 7 in which a cycle of traffic signals occurs within a time period determined by the frequency difference between FRA and FC; the N-S offset control will shift the phase of one of these signals slowly in the shortest direction from the previously selected offset (phase) to a newly selected offset; for example, line 110 in FIG. 10, when connected to a controller of the type shown in FIG. 7 may control relays 47 and 48 to shift the phase of line 17 (FR) in FIG. 7 which are equivalent to line FRA in FIG. 10. Alternatively line 110 in FIG. 10 may be connected to vary FC as has been stated.

Each of the transposers 120 and 130 slowly shift or displace in time the phase of the A.C. wave FR on lines 121 in the shortest possible direction in response to the E-W cycle length signal on lines 132 and 133 and the E-W offset signal on lines 113 and 131 to provide an A.C. signal FRB on line 124 common to all the controllers on avenue B and an A.C. signal FRC on line 136 common to all the local controllers on avenue C. Thus if the local controllers are of the type suggested in FIG. 7 and have line 110 connected to vary the phase of FRA, FRB and FRC respectively along the individual avenues, the waves FR will have been shifted in phase by E-W control and further shifted by N-S control in a cascaded arrangement as shown in FIG. 4; however line 110 control FC, both FR and FC will be varied as shown in FIG. 6.

As will appear more clearly in FIG. 11, the E-W offset signal on line 113 will determine whether the reference wave outputs FR$_B$ and FR$_C$ from the transposers for the avenues are displaced in time to lead or to lag each other as in the case of westbound or eastbound preferential offset while the E-W cycle length signal on lines 132 and 133 will control the amount of phase shift or offset of the reference waves in dependence upon the amount or volume of E-W traffic.

Thus the offset on any of the controllers on avenues B and C are controlled in response to the E-W offset, N-S offset and the E-W cycle length signals called for by the system selectors while the traffic signal cycle length for each of these controllers is determined by the relative frequency difference between the two A.C. waves.

FIG. 11 illustrates one form of a transposer as shown in the block diagram in FIG. 10. It includes three banks of six for a total of 18 three-phase potentiometers, two selector switch banks 160 and 200, a differential generator circuit 220, a comparator 215 and a motor 218. The operation of these elements is such that the selector switches shift or select a particular A.C. signal under control of the E-W measurements and differential generator rotates slowly in the shortest direction to provide the newly selected phase to thus slowly vary the offset of groups of controllers individual to that transposer.

The three-phase, 400-cycle reference waves FR on line 121 are connected to the stator of the differential generator 220 whose three phase rotor output is connected through an amplifier to lines 124 (in transposer 120) which is common to all the controllers on avenue B; similarly the differential generator rotor output is connected to lines 136 (in transposer 130) which is common to all the controllers on avenue C. The rotor output is also connected over three lines (shown as line 151) for connection to the three input leads 152', 152'', 152''' of a tree-type switching circuit 160. The switching circuit includes a plurality of fixed and movable contacts, the movable contacts are ganged at 161 and 162 to be operated by the armature of the eastbound offset relay 163 or the westbound offset relay 164. Either one, both or neither of these relays may be energized in dependence upon which of the offset lines 113 is energized.

Relay 164 is connected to a positive source of power at 165 and relay 163 is connected to a positive source of power at 166. Therefore when one of the lines 113 is grounded one relay is energized; when the other line 113 is grounded, the other relay is energized. Similarly both or neither relay may be energized.

The reference waves FR on lines 152', 152'', 152''' are applied to either the first, second or third bank of potentiometers depending upon the particular combination of relays energized. For example if the traffic flow is greater in the eastbound direction than in the westbound direction, the E-W system selector 109 of FIG. 10 will call for an eastbound offset thereby energizing the eastbound offset relay 163; the westbound relay 164 is deenergized. Thus the first phase on line 152' is connected through contact 153, contact 154, line 155, contact 156, contact 157, and line 158 to the stator of each of the potentiometers in the left hand bank. The second phase of reference signal FR is connected over line 152'' through contact 173, contact 174, line 175, contact 176, contact 177 and line 178 to a position on the stator of each of the potentiometers in the left bank displaced 120 degrees from the first connection.

The third phase of reference signal FR is connected from line 152''' through contacts 141 and 142, line 143, contacts 144 and 145 and line 146 to the third tap on the stators of the left bank of potentiometers which is displaced 120 degrees from the other two connections. Similarly it can be shown that if westbound offset is called for, relay 164 is energized while relay 163 is deenergized so that the three phase signals at 152 are connected to the stators of the third row of potentiometers over lines 181, 182 and 183. When both relays 163 and 164 are energized as for example when average offset is called for on line 113 (ground), the three-phase reference signals on lines 152', 152'' and 152''' are connected to the stators of the second row of potentiometers at the 120-degree points through lines 184, 185 and 186.

Each of the potentiometers has a pair of rotary brush contacts which are connected to a pair of slip rings to provide a single phase output signal to a pair of output leads. These rotors are individually manually adjustable at the transposers and have calibrated dial type knobs or other indicia of offset adjustment.

The output from the system selector at 12 in FIG. 1 and at 112 in FIG. 10 was shown as a single line to include systems having a varying current or voltage output. However, the preferred system selector and cycle selectors generally operate to provide one of a plurality of outputs for one range of input value over a scale of such ranges. When the inputs exceed one range of values, the selector steps into another mode of operation. Similarly if the input signals decrease below the present range of values, the selector will step down one or more steps. Therefore the lines 12 and 112 from the system selector will preferably include a plurality of output lines, one or more of which will be energized in dependence upon the input to the system selectors and the resulting operating step produced by these inputs.

Accordingly FIG. 11 shows six relays 190–195 each having one lead connected to a source of power. The other input lead of each of the relays will be connected to one of the six output leads 112 (not shown) from the E-W system selector 109 of FIG. 10 so that when the E-W system selector is on a short cycle A or its first step (such as where the E-W traffic volume is low) relay 195 will be energized. If the E-W traffic volume is large, the E-W system selector will be in fifth or sixth step E or F thereby energizing relays 191 or 190 respectively. Similarly relays 192, 193 and 194 will be energized if the E-W system selector is in its second, third or fourth step and calls for cycle D, C, or B respectively.

The single phase A.C. output signal from each potentiometer rotor in each row is connected in parallel to a pair of output leads. The first row of potentiometer outputs is connected to leads 201 and 202. Similarly the second, third, fourth, fifth and sixth rows of potentiometers are connected respectively to leads 203–204, 205–206, 207–208, 209–210, and 211–212. These leads are then connected to switch bank 200 so that one row of potentiometers provides a signal on lines 213 and 214 in dependence upon which one of the relays 190–195 is energized.

However, only one potentiometer in any row is energized because of the selection provided by offset relays 163 and 164 previously discussed.

Thus the phase of the reference signal on line 213 and 214 depends upon the E-W offset signal called for on line 113 from the E-W system selector, the E-W cycle length signal on line 112 called for by the E-W system selector 109 and the individual manual local adjustment of the potentiometer selected by the latter two mentioned factors. Thus the offset will be a function of both the direction of greater traffic flow in an E-W direction and the quantity or amount of this traffic flow. In addition, the N-S offset signal will be controlling the offset as was shown in FIG. 10.

The single phase reference output signal on lines 213 and 214 is compared in phase at 215 with one phase of the three phase A.-C. input reference wave on lines 216 and 217. Any difference in phase between these signals results in an error output signal in line 217 to drive motor 218 and rotate shaft 219 which is connected to the rotor of the differential generator 220.

The rotor of the differential generator is rotated until the three phase waves FRB on line 124 (for an avenue B transposer) or FRC on lines 136 for an avenue C transposer is the same phase as the reference signal on lines 213 and 214 which has been selected by the E-W offset and cycle length relays.

In addition comparator 215 includes two-way drive apparatus similar to that shown in FIG. 7 for sensing which is the shortest direction for the motor to rotate to its newly selected offset and further provides that motor drive slowly as through gearing to provide a change in offset slowly over a period of several traffic signal cycles (several minutes) as discussed in said U.S. Patent 2,989,728.

The result of the above circuitry is that the reference frequency wave FR, FRB and FRC on lines 124 or 136 at each local controller along a particular avenue may have any one of eighteen phase relationships each of which is locally adjustable and selectable slowly through a common differential generator in the shortest direction from one selected offset phase to another in dependence upon the E-W offset and E-W cycle demand. For example the controllers along avenue B will have a three phase reference signal FRB on line 124 from the differential generator 220 having any one of eighteen phases which have been manually adjusted and preselected for that avenue under various offset conditions. Similarly line 136 may have any one of eighteen preselected manually adjusted phases for that avenue under various offset conditions. These manual settings have all been preset to call for a particular displacement in time of the controllers along one avenue with respect to its adjacent avenue controllers for various E-W offsets and E-W cycle lengths.

One arrangement of the potentiometers for example, provides that the first bank of potentiometers for the avenue B transposer will produce a reference phase FRB on lines 124 which will lag the phase of the reference signal FRC produced on line 136 by the third bank of potentiometers in the transposer 130 assigned to avenue C. Thus if the reference phase on one avenue leads or lags the reference phase on another avenue, phase coincidence will occur earlier or later thereby resulting in an offset of controllers in each avenue all as shown for example in FIG. 9.

To provide average offset conditions, the second group of potentiometers in the transposers at both avenues B and C may produce some predetermined phase for each avenue which has been found to be suitable in average traffic conditions on that avenue as for example those shown in FIGS. 9G, 9H and 9K.

Thus a grid system is provided in FIGS. 10 and 11 in which the E-W cycle length and offset control, vary or select the phase of the reference signal FR slowly in the shortest possible direction in the transposer 120 for example to provide an output on line 124 for example which may be connected to the local controller of FIG. 7 at 17 for a still further variation in phase under control of the N-S offset relays 47 and 48. Alternatively, the transposers of FIG. 10 may vary FC (thus acting as blocks 61 and 62 in FIG. 6) to provide a slow variation in FC while the N-S control may slowly vary FR as shown in FIG. 7. Thus both of the waves may be shifted slowly or one wave may be shifted slowly by two control means in the cascaded fashion of FIG. 4.

In summary the foregoing description has disclosed several inventive aspects. First the invention has provided a local controller having an offset which may be varied automatically in response to two or more traffic conditions and more particularly the offset may be varied efficiently, smoothly and accurately by particular phase shifting or selection apparatus automatically in response to two or more traffic conditions. In addition the invention has disclosed that such an offset may be varied by control signals representing E-W cycle length, E-W offset and N-S offset.

This latter operation provides a grid system having an offset at each of the local controllers in the grid which may be shifted slowly as desired to provide a three dimension offset pattern which can supply any preferential offset desired automatically in response to traffic actuation.

Having thus described a preferred form of my invention, it will be obvious to those skilled in the art that my invention has numerous other applications and can be performed with other equivalent apparatus. For example while I have referred to the master signal of this invention as being a frequency difference signal which is varying in phase during one traffic signal cycle, it is obvious that cyclically repetitive pulses or varying voltage, current or frequency signals may be employed. All of such signals may be used to continuously synchronize the local time cycle and may be adapted for such double offset variations. Also, other means may be used for shifting or selecting the offset including adjustably positioned cams and associated switch contact and mechanical differential gearing; the phase shifters of FIG. 11 may be differential generators. While the invention has been described in terms of volume measurement and comparison by means of cycle selectors and system selectors, it will be obvious that the invention has application to any system where the relative traffic flow is measured and compared by any means. In addition it should be clear that while I have shown 18 potentiometers in the transposer to provide a variable offset for any one of three offsets and six cycle lengths, it will be obvious that both more and less complete systems may be devised within the scope of this invention. For example, in FIG. 11 the system may have only three potentiometers so that only three offsets are produced while the effect of the E-W cycle length is neglected. Also it should be noted that from one aspect of this invention, the local controllers are continually (or periodically if desired) looking at the master time cycle to maintain its local time cycle in synchronization with the master time cycle. It does this by sensing the master time cycle and responding at various phase, voltage or current relationships to step from one position to another and complete a cycle within the time period of the master time cycle but offset therefrom as desired.

I claim:

1. A master-local traffic control system comprising
master cyclic controller means for providing a periodic master time cycle,
a local controller controlled by said master cycle for controlling traffic signals in a local time cycle in which right-of-way is accorded in two intersecting traffic directions at two different predetermined percentages of said cycle,
offset control means for offsetting said local time cycle relative to said master time cycle individual percentages of said master time cycle in response to first offset control signals derived from measurement of traffic sensed in one direction and
further offset control means for further offsetting said local time cycle as so offset further individual percentages of said master time cycle in response to second offset control signals derived from measurement of traffic sensed in the intersecting direction so that the according of right-of-way in both traffic directions is displaced in time in dependence upon both traffic measurements.

2. A combination as in claim 1 and further including
means for measuring traffic volume in both intersecting traffic directions to provide said first and second offset control signals so that the total offset is a function of both traffic volumes.

3. A combination as in claim 1 further including
means for measuring the amount and direction of greater traffic flow along a roadway,
and said offset control means including
a plurality of groups of plural selectable offset determining means
means for selecting one of said groups of such offset determining means in response to greater traffic flow in one traffic direction rather than another,
and means for selecting one of said offset determining means from said selected group in response to the amount of traffic flow so that total offset of the local controller is determined by said one selected offset determining means.

4. A traffic control grid system including
master cyclic controller means for providing a periodic master time cycle,
local traffic controllers at the intersections of the grid controlled by said master time cycle for controlling traffic signals at each controller in a local time cycle in which right-of-way is accorded in two intersecting directions at two different predetermined percentages of said local cycle,
offset control means for offsetting the individual local cycle of the individual local controllers relative to said master time cycle by individual precentages of said master time cycle in response to control signals determined by traffic sensed in one direction of the grid to provide a first progression in time of right-of-way in said one direction,
and further offset control means for further offsetting said local time cycle of groups of controllers as so offset a further percentage of said master time cycle in response to a further control signal determined by traffic sensed in another direction of the grid while maintaining said first progression to thereby provide a second progression in time of right-of-way in said another direction of the grid.

5. A combination as in claim 4 further including
means for measuring traffic volume in one direction of the grid and
means for measuring traffic volume in another direction intersecting said one direction,
said respective measuring means providing the respective said control signals and in which the total offset is proportional to the sum of both traffic volumes.

6. A combination as in claim 4 further including
means for sensing the present offset and a prospective offset in which the prospective offset is called for by a change in said control signals determined by said sensed traffic,
and means including bi-directional drive means for sensing either one of two relationships between said present and prospective offsets for driving and bi-directional drive means in one or the other direction slowly in the shortest possible direction to provide said prospective offset as a present offset.

7. In a traffic control system,
cyclic master controller means for providing a periodic master time cycle for controlling a local controller for controlling traffic signals over a local time cycle,
a first differential generator having
a stator winding connected for receiving said master time cycle and
a rotor winding for providing an output depending upon the relative position of rotor and stator
a second differential generator having
a stator connected for receiving said output and
a rotor connected for controlling said local controller,
means for controlling the position of the rotor of the first generator relative to its stator in response to an electrical signal representing a first traffic measurement,
and means for controlling the position of the rotor of the second generator relative to the stator of the latter in response to an electrical signal representing a second traffic measurement.

8. A combination as in claim 7 in which the local time cycle is synchronized with the master time cycle as received and further including
means for normally rotating said rotors at a rate proportional to said traffic measurements thereby varying the rate of the received master time cycle and the cycle length of the local time cycle in proportion to said measurements.

9. A master-local traffic control system comprising
cyclic master controller means for generating a periodic master time cycle;
a local traffic controller including
a cyclic switch for controlling traffic signals and having a first position for according right-of-way in one traffic direction and a second position for according right-of-way in another traffic direction
and means controlled by said master time cycle for initiating operation of said cyclic switch from said first position toward said second position and from said second position toward said first position respectively at first and second percentage points respectively having predetermined spacing within said master time cycle so that a local time cycle of traffic signals is synchronized with the master time cycle;
and offset control means controlling said last named means for advancing or retarding in time the local time cycle from a reference point an individual percentage of the master time cycle time period in response to a first control signal derived from measurement of traffic sensed in one direction
and further offset control means for further advancing or retarding said local time cycle as so advanced or retarded a further individual percentage of the master time cycle time period in response to a second control signal derived from measurement of traffic sensed in another direction so that the offset of the local time cycle with respect to said reference is a function of the composite effect of both traffic measurements.

10. A traffic control grid system including
local traffic controllers at the intersections of the streets,
means for providing a master time cycle including two alternating current waves differing slightly in frequency from each other to provide a slow progressive phase shift with respect to each other and coinciding in phase at time intervals of the order of a desired traffic signal cycle,
and phase coincidence responsive means individual to each of the local controllers,
and differential generator means, said generator being connected for receiving one of said waves and for providing an output to said coincidence means,
phase shifting means for displacing the rotor of such generator in proportion to a first control signal derived from measurement of traffic sensed in one direction of the grid thereby varying the output phase from the generator,
a plurality of further differential generators each common to a group of controllers along individual streets,
means connecting said further generators for receiving one of said waves and for providing an output therefrom to the coincidence means of the controllers along its respective streets,
and phase shifting means for displacing the rotor of the individual further generators individual different amounts in response to a control signal derived from measurement of traffic sensed in a second traffic direction of the grid so that phase coincidence will occur at each of the controllers at different times forming a progression in both directions of the grid.

11. A traffic control grid system including
local controllers at the intersections of the streets,
means for providing for said controllers a master time cycle including two alternating current waves differing slightly in frequency from each other to provide a slow progressive phase shift with respect to each other and coincidence at time intervals of the order of a desired traffic signal cycle,
each controller including
  phase coincidence responsive means
  and a plurality of selectable locally adjustable resistance phase shift means,
means for selecting one of said phase shift means for shifting one of said waves and connecting said wave as so shifted to said coincidence means in response to signals corresponding to a first measurement of traffic in the grid,
a second plurality of selectable adjustable resistance phase shift means common to the coincidence means of all the controllers along one street,
a third plurality of selectable resistance phase shift means common to the coincidence means of all the controllers along a street parallel to said one street,
and means responsive to signals corresponding to a measurement of traffic flow in a second direction of the grid for selecting a resistance phase shifter in the second and third plurality having different output phases thereby providing a progression in phase coincidence in both directions of the grid.

12. A traffic control grid system including
cyclic master controlled means for generating a periodic master time cycle,
local traffic controllers at the intersections, each said local controller including
  means connected for synchronizing and initiating a cycle of right-of-way traffic signals in two intersecting directions respectively at two respective points having a predetermined time spacing within said master time cycle,
offset control means responsive to a first control signal derived from measurement of traffic sensed in a first direction for advancing or retarding the local time cycle of each of the individual local controllers individual percentages of the master time cycle in which the individual percentages are progressively greater at adjacent controllers in one traffic direction of the grid whereby said right-of-way is progressively provided in said one traffic direction while maintaining said predetermined spacing,
and further offset control means responsive to a second control signal derived from measurement of traffic sensed in a second direction for further advancing or retarding the local time cycle of local controllers along one street as so advanced or retarded an equal amount differing in amount from the further advance or retardation along other parallel streets to form a second traffic progression in the direction of streets intersecting said parallel streets while maintaining said first progression.

13. A traffic control system including
a cyclic master controller for generating a periodically varying electrical signal having a range of electrical values which are cyclically provided within a time period of the order of a traffic signal cycle and represent a master time cycle having a cyclic reference point and further time points,
a local traffic controller including
  means for switching traffic signals
  and local cycle offset control means for receiving said master time cycle and responding to at least one of said values representing a time point within said master time cycle period for controlling said signal switching means for initiating a local time cycle of traffic signal switching in synchronism with said master time cycle and offset with respect to said reference in the master time cycle in dependence upon the time point responded to
  and first and second offset shifting means each individually shifting the offset of the local switching time cycle individual percentages of the master time period in response to respective first and second control signals derived from traffic measurements of traffic sensed in predetermined directions of flow.

14. A combination as in claim 13 in which said local controller means includes
means for controlling a traffic signal twice during a traffic signal cycle upon receiving first and second successive values of said master signal,
and in which said first and second offset shifting means each provide a shift in offset in one or another direction so that the total offset of the value of the point responded to in the master time cycle is proportional to the algebraic sum of both traffic measurements.

15. A combination as in claim 13 in which the master time cycle signal means includes
means for generating two alternating current waves which differ slightly in frequency so that they are periodically in phase at time intervals of the order of a traffic signal cycle,
and in which said local controller includes
means for responding to phase coincidence between two alternating current waves,
and in which said first and second offset shifting means include
means for jointly shifting the relative phase relationship between the two waves and for connecting these waves to said phase coincidence means so that the local time cycle is offset with respect to the master time signal represented by the non-shifted waves.

16. A combination as in claim 13 in which one of the offset shifting means is connected to the master controller to displace in time the master time cycle signal and in which the other offset shifting means is connected to the local controller to displace in time the local time cycle with respect to said displaced master time cycle signal.

17. A traffic control system for a plurality of substantially parallel avenues and a plurality of substantially parallel cross streets which intersect with the avenues to form a grid comprising
  local traffic controllers at the intersections including
    means for switching traffic signals in response to time coincidence between two cyclic electrical signals varying in mutual time relation,
  means for providing first and second cyclic electrical signals having a slightly different frequency to vary cyclically in mutual time relation,
  means for connecting one of the cyclic electrical signals to each of the local traffic controllers,
  each local controller including
    time phase displacing means for displacing in time phase said relative time relationship between the cyclic electrical signals a first amount in response to a first control signal derived from measurement of traffic sensed along one traffic direction of the grid,
  further time phase displacing means individual to individual said avenues, each such further displacing means having an output common to all of the local controllers along said avenue,
  means connecting one of the cyclic electrical signals to the input of each of the time displacing means,
  and means connected to said time displacing means responsive to a further control signal derived from measurement of traffic flow sensed in the other traffic direction of the grid for displacing the relative time relationship between the cyclic electrical signals a second amount in time so that the relative time displacement of the two cyclic signals and the traffic signals with respect to each other at each local controller is controlled by traffic measurements along the avenues and streets.

18. A combination as in claim 17 in which the two cyclic signals are alternating current waves and further including
  means for measuring traffic flow in said one direction in the grid for providing said first control signal for changing the phase of one of the waves with respect to the other of said waves said first amount
and further including
  means for measuring traffic flow in the other traffic direction for providing said further control signal for further so changing the phase relationship between the two waves said second amount.

19. A combination as in claim 17 and further including
  means for measuring traffic volume in said one direction flowing both north and south and for comparing these volumes to control said displacement in time phase of one of said cyclic signals in dependence upon the larger measurement,
  means for measuring traffic volume in the other traffic direction flowing east and west and for comparing these volumes to control the displacement in time phase of the other of said cyclic signals in dependence upon the larger of these two measurements.

20. A combination as in claim 17 in which the cyclic signals are alternating current and in which the displacing means include
  phase shift means having
    a resistance stator connected to receive one of said cyclic signals
    and two adjustable rotor electrical contacts cooperating with said stator for providing an output signal varying in phase with respect to the other signal depending upon the angular position of the rotor.

References Cited by the Examiner

UNITED STATES PATENTS

| | | | |
|---|---|---|---|
| 3,056,946 | 10/1962 | Brockett | 340—35 |
| 3,079,587 | 2/1963 | Barker | 340—35 |
| 3,120,651 | 2/1964 | Hendricks | 340—35 |

NEIL C. READ, *Primary Examiner.*

THOMAS B. HABECKER, *Examiner.*